United States Patent
Kobayashi et al.

(10) Patent No.: US 7,541,087 B2
(45) Date of Patent: Jun. 2, 2009

(54) MULTILAYER FILM AND IMAGE DISPLAY DEVICE

(75) Inventors: Takashi Kobayashi, Shizuoka (JP);
Akira Hatakeyama, Kanagawa (JP);
Tatsuya Nomura, Shizuoka (JP);
Katsuyoshi Suzuki, Shizuoka (JP);
Hideo Fukazawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/798,112

(22) Filed: May 10, 2007

(65) Prior Publication Data

US 2007/0275218 A1 Nov. 29, 2007

(30) Foreign Application Priority Data

May 10, 2006 (JP) .............................. 2006-131611
Feb. 20, 2007 (JP) .............................. 2007-039754

(51) Int. Cl.
*B32B 7/02* (2006.01)
*B32B 27/08* (2006.01)
*B32B 27/18* (2006.01)
*B32B 27/36* (2006.01)

(52) U.S. Cl. ........................ 428/212; 428/213; 428/323; 428/328; 428/332; 428/336; 428/480; 428/910; 428/483; 359/601

(58) Field of Classification Search ........................ None
See application file for complete search history.

(56) References Cited

U.S. PATENT DOCUMENTS

| | | | | |
|---|---|---|---|---|
| 3,706,485 | A * | 12/1972 | Fawcett et al. ............... | 359/588 |
| 4,590,117 | A * | 5/1986 | Taniguchi et al. ............ | 428/212 |
| 5,314,947 | A * | 5/1994 | Sawaragi ..................... | 524/780 |
| 5,496,641 | A * | 3/1996 | Mase et al. ............... | 428/423.1 |
| 5,789,476 | A * | 8/1998 | Iryo et al. ..................... | 524/430 |
| 5,907,000 | A * | 5/1999 | Treadway ..................... | 522/79 |
| 5,925,438 | A * | 7/1999 | Ota et al. ..................... | 428/141 |
| 5,976,684 | A * | 11/1999 | Oyama et al. ............... | 428/216 |
| 5,990,984 | A * | 11/1999 | Meredith et al. ............. | 348/834 |
| 6,048,936 | A * | 4/2000 | Epple et al. .................. | 525/124 |
| 6,207,263 | B1 * | 3/2001 | Takematsu et al. .......... | 428/220 |
| 6,245,428 | B1 * | 6/2001 | Port et al. .................... | 428/421 |
| 6,335,832 | B1 * | 1/2002 | Oka et al. .................... | 359/582 |
| 6,440,568 | B1 * | 8/2002 | Kayanoki et al. ......... | 428/425.9 |
| 6,458,467 | B1 * | 10/2002 | Mizuno et al. ............... | 428/480 |
| 6,657,691 | B2 * | 12/2003 | Ochiai et al. ................. | 349/137 |

(Continued)

FOREIGN PATENT DOCUMENTS

JP 2000-111706 * 4/2000

(Continued)

*Primary Examiner*—Vivian Chen
(74) *Attorney, Agent, or Firm*—Sughrue Mion, PLLC

(57) ABSTRACT

A multilayer film is produced by forming a first and a second layers consecutively on at least one surface of a biaxially stretched polyester base. The first layer contains particles and a binder both composed mainly of either tin oxide, indium oxide, zirconium oxide, or titanium oxide. When the refractive indexes of the base, the first layer, and the second layer are represented by $\eta 1$, $\eta 2$, and $\eta 3$ respectively, the first layer and the second layer are adjusted for the refractive index such that the differences $|\eta 1-\eta 2|$ and $|\eta 1-\eta 3|$ are both not greater than 0.03. Adhesive strength is therefore kept high between the base and the layers to eliminate light interference, and the multilayer film offers an excellent optical property with few color rainbow effect.

8 Claims, 1 Drawing Sheet

U.S. PATENT DOCUMENTS

| | | | |
|---|---|---|---|
| 6,747,801 B2 * | 6/2004 | Umemoto et al. | 359/599 |
| 6,777,070 B1 * | 8/2004 | Murata et al. | 428/323 |
| 6,818,699 B2 * | 11/2004 | Kajimaru et al. | 524/845 |
| 6,841,272 B2 * | 1/2005 | Shoshi et al. | 428/697 |
| 6,890,644 B2 * | 5/2005 | Kayanoki | 438/323 |
| 2001/0033934 A1 * | 10/2001 | Port et al. | 428/421 |
| 2003/0104216 A1 * | 6/2003 | Koda et al. | 428/423.1 |
| 2008/0013179 A1 * | 1/2008 | Kobayashi et al. | 359/587 |

FOREIGN PATENT DOCUMENTS

| | | |
|---|---|---|
| JP | 2000-111706 A | 4/2000 |
| JP | 2001-294826 A | 10/2001 |
| JP | 2003-177209 * | 6/2003 |
| JP | 2003-177209 A | 6/2003 |
| JP | 2004-54161 A | 2/2004 |
| JP | 2005-97571 A | 4/2005 |

* cited by examiner

MULTILAYER FILM AND IMAGE DISPLAY DEVICE

FIELD OF THE INVENTION

The present invention relates to a multilayer film and image display devices equipped with this multilayer film.

BACKGROUND OF THE INVENTION

As image display devices of all kinds, such as liquid crystal display devices, plasma display devices, organic EL display devices, surface-conduction electron-emitter display (SED) devices, and CRT display devices are becoming more popular these days, a demand for an optical film, one of their main components, is also increasing. The optical film is a film with various optical functions, and used for improvement of viewing angle, optical unevenness, and other optical properties to achieve a good visual quality of the image display devices. Generally, the optical film takes a multilayer structure composed of a polymer-made base and one or more upper layers.

In most cases, a polyester film is used as the base because of its transparency, dimensional stability, chemical resistance, and low hygroscopicity. The upper layer determines the function of the optical film, and may be selected from optical function layers such as a prism layer, an anti-reflection layer, and a light scattering layer, and/or mechanical function layers such as a low refractive-index layer that shows good rub resistance. These upper layers are combined with the base according to an intended purpose, and form a variety of optical films ranging from, for example, a prism film, an anti-reflection film, and light scattering film for image display devices to an IR absorbing film, an electromagnetic wave shielding film, a toning film, anti-reflection film, anti-glare film, and a hard hard coat film for the plasma display devices.

An important factor to an excellent optical property of the optical films is high adhesive strength between the base and the upper layers. However, the adhesive strength is not easily kept high because it is susceptible to the differences in composition, a forming condition, and other parameters among the base and the upper layers. In view of this, Japanese Patent Laid-open Publication No. 2001-294826 discloses a multilayer film with high adhesion strength, which has a polyester film as the base, and an adhesion assist layer placed on the base and containing a binder of polyester.

The optical film should also give a good display performance to ensure an excellent visual quality of the image display devices. In the multilayer film, however, light beams will reflect at the boundaries of the base to the adhesive layer, the adhesive layer to the upper layer, and the upper layer to the air, and such reflected light beams interfere with each other to cause uneven luminance distribution that gives a rainbow color (hereinafter, color rainbow effect). The color rainbow effect, which significantly degrades the display performance of the multilayer film, is susceptible to the thickness variation of each layer. Especially when the upper layer has thickness variation, the reflected light beam becomes more intense at a certain thickness, and the color rainbow effect is more apparent on the multilayer film.

In view of this, Japanese Patent Laid-open Publication No. 2003-177209 discloses a manufacturing method of the optical films in which the adhesion assist layer is controlled on its refractive index and thickness to reduce the rainbow colored spots. Also, Japanese Patent Laid-open Publication No. 2004-054161 discloses a multilayer film containing metal oxide particles with a controlled particle diameter and a controlled refractive index. Furthermore, Japanese Patent Laid-open Publication No. 2005-097571 discloses a multilayer film having a waterborne coating layer of a water-soluble compound and a layer stretched in at least one direction, as an upper layer on a polyester-made base. Additionally, Japanese Patent Laid-open Publication No. 2000-111706 discloses a multilayer film having the adhesion assist layer and other upper layers adjusted to create a given difference in refractive index from a high refractive index base.

Each of the upper layers, of all the above multilayer films, contains particles to adjust the optical properties such as the refractive index of the base and the upper layers, and also the adhesion assist layer contains particles or chelate compounds. However, these particles or the chelate compounds in the adhesion assist layer sometimes separate out toward the base and the upper layer, and decrease the adhesive strength between them. Although the publication No. 2000-111706 disclose to adjust the refractive index of the polymer for the adhesion assist layer, instead of adding the particles, such a polymer is generally expensive and leads to increase the manufacturing cost.

SUMMARY OF THE INVENTION

In view of the foregoing, a primary object of the present invention is to provide a multilayer film with high adhesive strength between the constructional elements and few color rainbow effect, designed to act as an optical film to offer an excellent anti-reflection property, an excellent anti-light diffusion property, and other such excellent optical properties.

Another object of the present invention is to provide image display devices equipped with this multilayer film for an excellent visual quality.

In order to achieve the above and other objects, the multilayer film according to the present invention includes a base made of polyester, and a first and a second layers placed on the base. The first layer contains particles and a binder, wherein the particles are composed mainly of either tin oxide, indium oxide, zirconium oxide, or titanium oxide. A difference $|\eta 1-\eta 2|$ between a refractive index $\eta 1$ of the base and a refractive index $\eta 2$ of the first layer is 0.03 or less. Also, a difference $|\eta 1-\eta 3|$ between the refractive index $\eta 1$ and a refractive index $\eta 3$ of the second layer is 0.03 or less.

The binder of the first layer is preferably at least one of polyester and urethane. Also preferably, the first layer contains a compound having plural carbodiimide structures in each molecule, and a thickness of the first layer is uniform and adjusted to the range of 20-400 nm.

The polyester of the base is polyethylene terephthalate, and both of $\eta 1$ and $\eta 2$ are preferably from 1.62 to 1.68. Additionally, the base is preferably a biaxially stretched member.

The second layer is preferably a hard coat layer. In this case, it is also preferred to form an anti-reflection layer on top of the hard coat layer.

An image display device according to the present invention has the above multilayer film.

According to the present invention, the adhesive strength is increased between the base and the layers, and the color rainbow effect is reduced. It is also possible to produce a variety of optical films, such as a prism film, a hard hard coat film, and an anti-reflection film, with excellent optical properties by forming an optical function layer and/or an physical function layer, such as a prism layer, a hard coat layer, an anti-reflection layer, or a light diffusion layer, having abrasion resistance as a second layer of the multilayer film. The use of such optical films allows for producing the image display devices with excellent visual quality.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

The present invention is now described with preferred embodiments. It is to be understood, however, that the following embodiments are mere examples, and do not limit the scope of the present invention.

Figure 1:
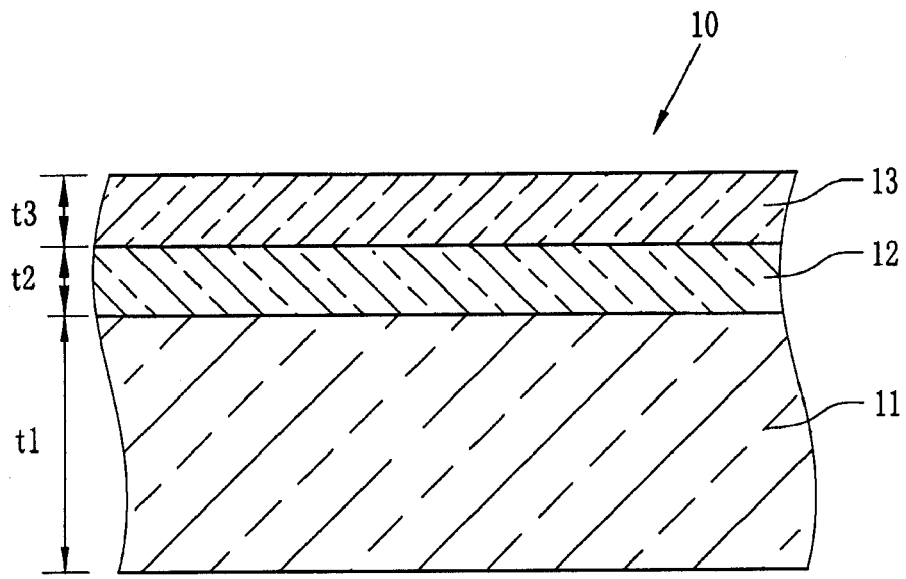
FIG. 1 is a cross sectional view of a multilayer film according to a first embodiment of the present invention.

Referring to FIG. 1, a multilayer film 10 according to the first embodiment of the present invention is composed of a film-like base (hereinafter, base) 11 made of polyester, and a first layer 12 and a second layer 13 on the base 11.

Both the first layer 12 next to the base 11, and the second layer 13 open to the air are made of polymer, and composed of at least one layer. In practice, the number and the kind of these layers are not limited particularly, but rather determined according to an intended purpose. Additionally, the first layer 12 and the second layer 13 do not need to have the same structure and composition. In this embodiment, the first and the second layers 12, 13 both have a single layer structure. It is to be noted that the first layer 12 may be provided on both sides of the base 11. Usually, a rear surface of the base 11 is provided with an adhesive layer and a desired function layer such as, for example, an infrared blocking layer. If the base 11 has the first layer 12 on both sides in this case, and one of the first layers 12 is covered with, for example, a near-infrared blocking (NIRA) coat, the multilayer film 10 becomes an anti-reflection film for plasma display panels and the adhesion assist property between the base 11 and the layers is maintained.

When the refractive indexes of the base 11, the first layer 12, and the second layer 13 are represented by η1, η2, and η3 respectively, the differences |η1−η2| and |η1−η3| of these refractive indexes are both kept to 0.03 or less. Preferably, the differences are kept to 0.02 or less, and more preferably to 0.01 or less. In the multilayer film 10 with such a controlled refractive index, the interference of light due to the boundaries among the base and the upper layers is prevented, and the color rainbow effect is effectively reduced. However, when the refractive index difference is over 0.03, such interference of light increases, and the color rainbow effect is caused easily. It is to be noted that if the first layer 12 and the second layer 13 have the multi-layer structure, the refractive index difference is adjusted to the above range between each layer and sub-layer.

The refractive index difference can be adjusted by adding a certain kind and amount of particles to each layer, or by selecting a polymer for each component based on the refractive index. Although the refractive index of each component is measured at the wavelength range of 550-600 nm in the present invention, the measurement method is not limited particularly but any common method.

[Base]

The base 11 can be made of common polyester such as, for example, polyethylene terephthalate, polyethylene naphthalate, polybutylene terephthalate, and polybutylene naphthalate. Particularly preferable among these is the polyethylene terephthalate in terms of cost and mechanical strength. When the base 11 is made of polyethylene terephthalate, the refractive index η2 of the first layer 12 is preferably from 1.62 to 1.68.

A UV-absorbing agent may preferably be added to the above polyester so as to ensure an acceptable level of optical property. The additive amount of the UV-absorbing agent is controlled such that a light transmittance of the base 11 becomes 3.00% or below at 380 nm wavelength. Specifically, the ratio of the UV-absorbing agent is kept in the range of 0.1-5.0% by mass with respect to the entire amount of polyester. A more preferable range is 0.2-3.0% by mass, and an even preferable range is 0.3-2.0% by mass. The light transmittance of the base 11 will be 3.00% or below when the amount of the UV-absorbing agent is kept in this range, and it is therefore possible to prevent such drawback as dissolution of dyes in an infrared blocking layer due to UV radiation. It is to be understood that the light transmittance should be kept as low as possible in the above range.

Although it can be added to the polyester by any method, the UV-absorbing agent may be kneaded into the polyester during a polyester polymerization process, or during a polyester melting process before a polyester extrusion process. Especially, during the polyester melting process, the kneading operation will not unnecessarily lower the degree of polymerization. The UV-absorbing agent can be kneaded in the form of powders or a master batch into the polyester. A preferable UV-absorbing agent has a structure expressed by the following structural formula 1. Alternatively, the UV-absorbing agent can be a benzophenone type, a benzotriazole type, a salicylate type, a cyanoacrylate type, a benzoxazine type, or a triazine-coumalin copolymer type. Additionally, all the technical matter in Japanese Patent Laid-open Publication No. 2002-244247 can be incorporated as common knowledge about the UV-absorbing agent.

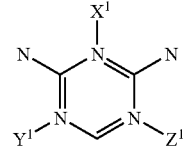

[Structural formula 1]

Each of $X^1$, $Y^1$, and $Z^1$ in the above formula 1 represents one of an alkyl group, an aryl group, an alkoxy group, an aryloxy group, an alkylthio group, an arylthio group, and a heterocycle group, with or without substitution. Additionally, at least one of $X^1$, $Y^1$, and $Z^1$ represents a substituent expressed by the following structural formula 2.

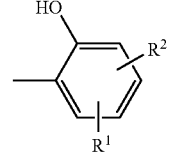

[Structiral formula 2]

Each of $R^1$ and $R^2$ in the formula 2 represents one of a hydrogen atom, a halogen atom, an alkyl group, an alkenyl group, an aryl group, an alkoxy group, an aryloxy group, an acyloxy group, an alkylthio group, an arylthio group, an amino group, an acyl group, an oxicarbonyl group, a carbamoyl group, a sulfamoyl group, a carboxyl group or its salt, and a sulfo group or its salt, with or without substitution. Additionally, adjacent $R^1$ and $R^2$ can be linked to form a closed chain.

It is preferred to stretch the base 11 biaxially. In other words, the base 11 is stretched along two axes, i.e., a width direction and a length direction thereof. Such a stretched polyester film is called a biaxially oriented polyester film, which exhibits well-controlled molecular orientation and excellent mechanical strength. Although it is not limited particularly, a draw ratio is preferably in the range of 1.5-7 in one direction, and more preferably in the range of 2-5. Especially, with the draw ratio of 2-5 in one direction, the molecular orientation is controlled more effectively and the mechanical strength of the base 11 becomes excellent enough for the purpose. If the draw ratio is below 1.5, however, the mechanical strength of the base 11 will be insufficient. On the other hand, if the draw ratio is over 7, the thickness of the base 11 will become uneven.

The base 11 preferably has a thickness t1 (μm) in the range of 30-400 μm. More preferably, the thickness t1 is in the range of 35-350 μm. The thickness t1 can be adjusted easily by controlling the draw ratio for the biaxial stretching. However, the thickness t1 below 30 μm will be too thin to manage, and the thickness t1 beyond 400 μm is also inappropriate because the reduction in size and weight of the image display devices is hindered and the manufacturing cost is increased.

[First Layer]

The first layer 12 is placed adjoining the base 11, and includes a binder and particles which contain either tin oxide, indium oxide, zirconium dioxide, or titanium oxide as a main component. In the present invention, the main component is the largest amount component.

Thickness t2 (μm) of the first layer 12 is preferably uniform and in the range of 20-400 μm. More preferably, the thickness t2 is in the range of 30-200 μm. With this range of thickness, the first layer 12 sufficiently shows a desired optical property. If the thickness t2 is below 20 nm, a uniform thickness is hard to achieve, or the layer has a poor surface condition. If the thickness t2 is beyond 400 nm, on the other hand, transparency and a surface condition of the layer are hard to be good. As for the first layer 12 having a multi-layer structure, the total thickness of the first layer 12 is regarded as the thickness t2.

The binder in the first layer 12 (hereinafter, first binder) is preferably at least one of polyester and urethane. The polyester is a general term for the polymers having an ester bond in the main chain, and is generally produced by the chemical reaction of polycarboxylic acid and polyol. The polycarboxylic acid is, for example, fumaric acid, itaconic acid, adipic acid, sebacic acid, terephthalic acid, isophthalic acid, naphthalenedicarboxylic acid, and sulfoisophthalic acid. The polyol is, for example, ethylene glycol, propylene glycol, 1,4-butanediol, 1,6-hexanediol, glycerin, hexanetriol, neopentyl glycol, polyethylene glycol, polypropylene glycol, and polytetramethylene glycol. In this way, the first layer 12 of the present invention is formed, on the polyester-made base 11, with the first binder which is the same type of polyester as the base 11, and the adhesive strength can therefore be enhanced between the base 11 and the first layer 12.

The urethane is a general term for the polymers having an urethane bond in the main chain, and is generally produced by the chemical reaction of polyisocyanate and polyol. The polyisocyanate is, for example, TDI, MDI, NDI, TODI, HDI, and IPDI. The polyol is, for example, ethylene glycol, propylene glycol, glycerin, and hexanetriol. Additionally, the isocyanate can be a polymer with increased molecular weight, made by a chain extension process to an polyurethane polymer of the polyisocyanate and the polyol. These polyisocyanate, polyol, and chain extension process are described thoroughly in "Polyurethane Handbook" (edited by Keiji Iwata, published by Nikkan Kogyo Shinbunsha, 1987), and the content of this publication can be incorporated in the present invention.

As above stated, the first layer 12 includes the particles whose main component is either tin oxide, indium oxide, zirconium dioxide, or titanium oxide, the refractive index of the first layer 12 can be easily adjusted. Although these particles would possibly aggregate in the first layer 12 and lower the transparency, such aggregation can be prevented by a proper choice of the diameter and the kind of the particles. In particular, an average diameter of the particles is preferably 5-200 nm. A more preferable average diameter is 10-100 nm, and a still more preferable average diameter is 15-70 nm. If the average diameter of the particle is above 200 nm, the first layer 12 will be less transparent to the eyes, and even the particle itself would be an obstacle to light to lower the light transmittance. If the average diameter of the particle is below 5 nm, on the other hand, the particles will be too expensive to produce, and may possibly aggregate into a huge mass which lowers the light transmittance. In the present invention, the diameter of the particle is measured on the circle which has the same surface area as a photographed particle taken with a scanning electron microscope, and the average diameter is calculated from the diameters of fifty particles.

A preferable particle for the first layer 12, among those mentioned above, is the tin oxide, the zirconium dioxide, or the titanium oxide because of their ready availability and their relatively low price. The tin oxide is preferably tin(IV) oxide with the formula $SnO_2$, and preferably be doped with antimony or the like. The doped tin oxide is electrically conductive, and thus reduces the multilayer film's surface resistivity and prevents adhesion of dust and other impurities. The antimony-doped tin oxide is, for example, FS-10D, SN-38F, SN-88F, SN-100F, TDL-S, and TDL-1 (product names: Ishihara Sangyo Kaisha, Ltd.), and these are all suitable to the present invention. Alternatively, phosphorus-doped tin oxide can also be used.

The zirconium dioxide is preferably zirconium(IV) dioxide with the formula $ZrO_2$. Such zirconium dioxide is, for example, NZS-20A and NZS-30A (product names: Nissan Chemical Industries, Ltd.). The titanium oxide is preferably titanium(IV) oxide with the formula $TiO_2$. Although the titanium oxide is divided into two types, a high temperature tetoragonal type or rutile type, and a low temperature tetoragonal type or anatase type, both can be used in the present invention. Also, surface-treated titanium dioxide can be used. Such titanium dioxide is, for example, IT-S, IT-O, and IT-W (product names: Idemitsu Kosan Co., Ltd.).

Acceptable polyester and its materials for the first binder are described in, for example, "Polyester Handbook" (edited by Eiichiro Takiyama, published by Nikkan Kogyo Shinbunsha, 1988), and the content of this publication can be incorporated in the present invention. It is to be understood that the first binder is not limited to the polyester or the urethane, but can be other polymers such as, for example, (a) acrylic resin and (b) rubber based resin.

The (a) acrylic resin is a group of polymers derived from acrylic acid, methacrylic acid, or their derivatives. The acrylic resin may be a copolymer composed of a main component, such as acrylic acid, methacrylic acid, methyl methacrylate, ethyl acrylate, butyl acrylate, 2-ethylhexyl acrylate, acrylamide, acrylonitrile, or hydroxyl acrylate, and a copolymerizable monomer (for example, styrene or benzene).

The (b) rubber based resin is a group of synthetic diene rubbers such as, for example, polybutadiene, styrene-butadiene copolymer, styrene-butadiene-acrylonitrile copolymer, styrene-butadiene-divinylbenzene copolymer, butadiene-acrylonitrile copolymer, and polychloroprene. The details of the rubber based resin is described in "Synthetic Rubber Handbook" (edited by Shu Kanbara et al., published by Asakura Publishing Co., Ltd., 1967).

It is especially preferred that the polymer for the first binder has one or more carboxyl groups in the molecule. The first binder can either be a mixture of a desired polymer and an organic solvent, or a water dispersion of a desired polymer. Alternatively, a water-soluble polymer can be used as the first binder. In this respect, a water-based matter is favorable in view of environmental load, and therefore the water dispersion or the water-soluble polymer is preferred. The water dispersion or the water-soluble polymer is not limited particularly, but selected from the commercial products.

Preferred water dispersion and water-soluble polymer are, for example, SUPERFLEX 830, 460, 870, 420, 420NS (product names: Dai-ichi Kogyo Seiyaku Co., Ltd.), VONDIC 1370NS, 1320NS, HYDRAN AP-40F (product names: Dainippon Ink And Chemicals Incorporated.) and such a polyurethane-based water dispersion, JURYMER ET325, ET410, SEK301 (product names: Nihon Junyaku Co., Ltd.), VONCOAT AN117, AN226 (product names: Dainippon Ink And Chemicals Incorporated.) and such an acryl-based water dispersion, RACKSTAR DS616, DS807 (product names: Dainippon Ink And Chemicals Incorporated.), Nipol LX110, LX206, LX426, LX433 (product names: Zeon Corporation) and such a styrene-butadiene rubber-based water dispersion, NIPOL LX513, LX1551, LX550, LX1571 (product names: Zeon Corporation) and such a butadiene-acrylonitrile rubber-based water dispersion, FINETEX ES650, ES2200 (product names: Dainippon Ink And Chemicals Incorporated.), VYLONAL MD1400, MD1480 (product names: Toyobo Co., Ltd.) and such a polyester-based water dispersion, PLAS COAT Z-221, Z-561, Z-730, RZ-142, Z-687 (product names: Goo Chemical Co., Ltd.) and such a water-soluble polyester polymer.

The first binder may include one kind of polymer, or more than one kind of polymers. Although the molecular weight of the polymer is not limited particularly, a preferable weight-average molecular weight is from 3000 to 1000000. The polymer with the weight-average molecular weight below 3000 would possibly fail to provide an adequate strength to the first layer 12. On the other hand, the polymer with the weight-average molecular weight beyond 1000000 would possibly impair the surface condition of the first layer 12. Accordingly, the molecular weight is adjusted in the above range, and the first layer 12 will have enough strength and an excellent surface condition.

The first layer 12 preferably contains a carbodiimide compound which has plural carbodiimide structures in the molecule. The carbodiimide compound is not limited particularly, as long as it has plural carbodiimide groups. Therefore, the number of the carbodiimide groups is also not limited. Although the carbodiimide is generally synthesized by the condensation reaction of organic diisocyanate, the organic group of the organic diisocyanate is not limited particularly in the present invention but may either be an aromatic group, an aliphatic group, or the mixture of these. Preferable among these is the aliphatic group in terms of reactivity. A raw material for the synthesis may be organic isocyanate, organic diisocyanate, organic triisocyanate, or such.

The organic isocyanate is, for example, aromatic isocyanate, aliphatic isocyanate, or the mixture of these. Specifically, the organic isocyanate may be one of 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethyl-hexamethylene diisocyanate, 4,4'-dicyclohexylmethane diisocyanate, and 1,3-phenylene diisocyanate. Additionally, an organic monoisocyanate may be isophorone isocyanate, phenyl isocyanate, cyclohexyl isocyanate, butyl isocyanate, or naphthy isocyanate. The carbodiimide compound can be selected among the commercial products such as, for example, CARBODILITE V-02-L2 (product name: Nisshinbo Industries, Inc.).

A preferred amount of the carbodiimide compound is 1-200% by mass with respect to the binder. A more preferable amount is 5-100% by mass. With the additive amount of the carbodiimide compound below 1% by mass, the particles would possibly fall away from the first layer 12. With the additive amount beyond 200% by mass, on the other hand, the first layer 12 would possibly have a poor surface condition. Accordingly, the additive amount is kept in the above range to avoid these problems.

In order to enhance the lubrication, the first layer 12 may contain particles that act as a matting agent. This matting agent can be organic or inorganic such as, for example, a polymer particle of polystyrene, polymethyl methacrylate, silicon resin, or benzoguanamine resin, or an inorganic particle of silicon dioxide, calcium carbonate, magnesium oxide, and magnesium carbonate. Preferable among these are the polystyrene, the polymethyl methacrylate, and the silicon dioxide because they are well lubricate and low cost.

For good lubrication of the first layer 12, the matting agent may preferably have an average particle diameter of 0.01-12 μm. More preferably, the average particle diameter is 0.03-9 μm. If the average particle diameter is below 0.01 m, the lubrication is not sufficient. If the average particle diameter exceeds 12 μm, on the other hand, the visual quality of the image display devices would possibly be degraded. Namely, the average particle diameter in the above range can contribute to the good lubrication and the good visual quality. The amount of the matting agent, although depending partly on the average particle diameter, is preferably in the rage of 0.1-30 mg/m$^2$, or 0.5-20 mg/m$^2$ more preferably for good lubrication and visual quality. It is to be noted that the average particle diameter of the matting agent is calculated by the above mentioned method.

The first layer 12 can also contain a surface-active agent (surfactant) and other additives. The surfactant may be of, for example, common anion type, common non-ion type, or common cation type. The detail of the surfactant is described in, for example, "Handbook of Surface Active Agent" (edited by Ichiro Nishi, Ichiro Imai, and Masatake Kasai, Published by Sangyo Tosho Publishers, Inc., 1960). The amount of the surfactant, where needed, is in the range of 0.1-30mg/m$^2$ preferably, or in the range of 0.2-10 mg/m$^2$ more preferably. If the amount of the surfactant is below 0.1 mg/m$^2$, the effect of the agent would be inadequate to possibly allow for water-repelling of the first layer 12. If the amount exceeds 30 mg/m$^2$, on the other hand, the first layer 12 would possibly have a poor surface condition. Accordingly, the amount of the surfactant is kept in the above range so as to avoid these problems.

The first layer 12 may contain an antistatic agent. The antistatic agent, although it is not limited particularly, may be an electron-conducting polymer such as polyaniline or polypyrrole, an ion-conducting polymers having a carboxyl group or a sulfonate group in the molecular chain, or a conducting particle. The conducting particle can be identical to the above mentioned particle derived from the tin oxide, the indium oxide, the zirconium dioxide, or the titanium oxide. For example, the tin oxide conducting particle described in Japanese Patent Laid-open Publication No. 61-020033 is preferred in terms of conductivity and transparency. The amount of the antistatic agent, where needed, is preferably adjusted to the extent that the first layer 12 has surface resistivity between $1\times10^5$ Ω and $1\times10^{13}$ Ω at 25° C., 30% RH. If the surface resistivity of the first layer 12 is below $1\times10^5$ Ω, the amount of the antistatic agent is large enough to possibly lower the transparency of the first layer 12. On the other hand, if the surface resistivity exceeds $1\times10^{13}$ Ω, the antistatic effect is inadequate to possibly cause the adhesion of dust and other impurities on the first layer 12. Namely, the surface resistivity in the above range will lead to produce the antistatic, dust-free first layer 12.

Preferably, the first layer 12 contains a lubricant for even better lubrication. A preferred lubricant is an aliphatic wax, and the additive amount thereof is 0.1-30 mg/m$^2$ preferably, and 0.5-10 mg/m$^2$ more preferably. If the amount of the lubricant is below 0.1 mg/m$^2$, the lubricating effect is inadequate. On the other hand, if the amount exceeds 30 mg/m$^2$, the adhesive strength may possibly be lowered between the first layer 12 and the second layer 13. Accordingly, the amount of the lubricant is kept in the above range so as to provide good lubrication and adhesive strength. The detail of the aliphatic waxes is described in Japanese Patent Laid-open Publication No. 2004-054161.

Next, the procedures for forming the first layer 12 is explained. Firstly, the first binder, the particles, and other additives are added in a solvent to form a coating liquid. This coating liquid is then applied to the surface of the base 11, and forms thereon a coating layer. Dried on the base 11, the coating layer turns into the first layer 12. Since the first binder becomes fluid and more manageable when diluted in the solvent, the coating layer of uniform thickness can be easily formed. The solvent may be toluene, methanol, isopropyl alcohol, methyl ethyl ketone, or the mixture of these. Additionally, the solubility of the first binder and additives in the solvent is not limited particularly. Therefore, the coating liquid can either be a dispersed substance or a dissolved substance. Alternatively, the solvent may be water. The water is advantageous in terms of cost savings and ease of manufacture.

The coating layer is preferably dried to have a residual solvent volume not greater than 5% by mass in the dried state. More preferably, the residual solvent volume may not be greater than 2% by mass, and still more preferably it may not be greater than 1% by mass. Because the degree of polymerization of the polymer increases as the residual solvent volume is reduced, an optical property distribution will be uniform on the plane of the coating layer. The drying condition for the coating layer, however, is not limited particularly but rather determined appropriately according to the parameters such as the heat resistance of the base 11 and the first layer 12, the transport speed, and the duration of the drying process.

As above mentioned, the coating liquid is preferably applied to the base 11 which has been stretched biaxially. It is, however, possible to form the first layer 12 on the base 11 which has been stretched in one direction, and then stretch the base 11 in the other direction. In this case, the first stretching direction of the base 11 can be either the width or the length direction.

Additionally, the forming method of the first layer 12 is not limited particularly, as long as a desired thickness is given to the layer. Therefore, the coating method also is not limited particularly, but rather selected among common thin film forming methods such as, for example, the dipping method, the spinner method, the spray method, the roll coater method, the gravure method, the wire bar method, the slot extrusion coater method (single or multi layer), and the slide coater method. These coating methods can be used for all the layers of the present invention, i.e., the first layer 12 and the second layer 13.

[Second Layer]

The second layer 13 is formed on the first layer 12, and composed of one or more functional layers having rub resistance and various optical functions. Although the functional layers can be selected according to need, they may be a prism layer, a hard coat layer, and a light diffusion layer, and then the optical film will act as a prism film, a hard coat film, and a light diffusion film.

Here, the hard coat layer as the second layer 13 is explained. The second layer 13 preferably has a thickness t3 (nm) in the range of 200-10000 nm. More preferably, the thickness t3 is in the range of 300-5000 nm, and even preferably in the range of 400-4000 nm. With the thickness t3 beyond 10000 nm, the second layer 13 may possibly crack. With the thickness t3 below 200 nm, on the other hand, a desired property is hard to obtain. Accordingly, the thickness t3 is controlled in the above range so as to give adequate rub resistance and optical property to the second layer 13.

As for the prism film, the methods of Japanese Laid-open Publications No. 06-067004 and No. 06-067178 can be utilized in the present invention. Similarly, as for the light diffusion film, the methods of Japanese Laid-open Publications No. 07-013002 and No. 09-061804 can be utilized in the present invention. As for the hard coat layer, the details thereof are explained later.

Figure 2:
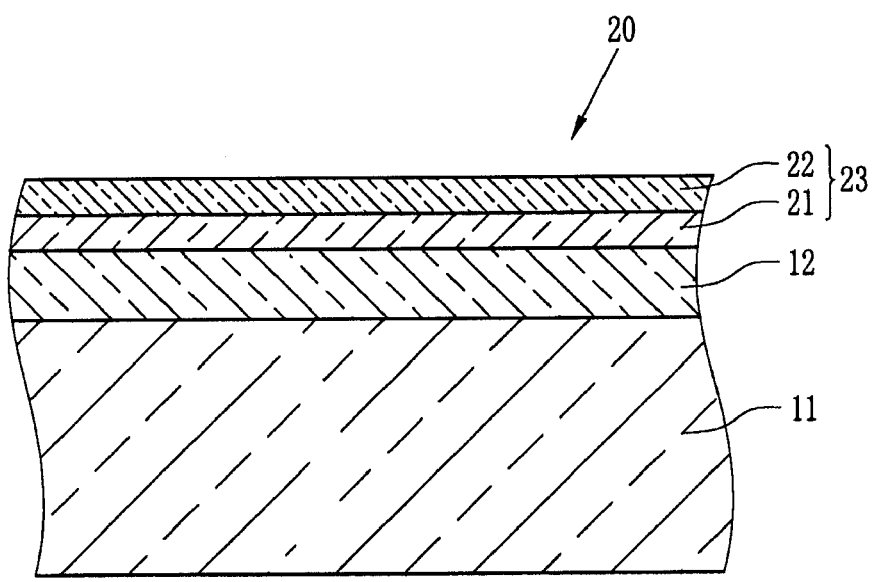
FIG. 2 is a cross sectional view of a multilayer film, configured to be an anti-reflection film, according to a second embodiment of the present invention.

Next, a second embodiment of the present invention is explained. A multilayer film 20, shown in FIG. 2, is configured to act as an anti-reflection optical film. The multilayer film 20 includes the polyester-made base 11, the first layer 12, both the same components as in the first embodiment, and a second layer 23 composed of two different functional layers, i.e., a hard coat layer 21 and an anti-reflection layer 23. The refractive index difference between the layers is adjusted to the same range as the first embodiment. Although the film 20 has a multilayer structure, this configuration and adjustment in refractive index ensure a superior adhesive strength and prevention of the interference of light between the layers, and thus reduce the color rainbow effect. This multilayer film 20 can be used, as an anti-reflection film with excellent visual quality, in various types of image display devices.

The hard coat layer 21 is preferably formed with either energy curable resin polymer or thermosetting resin polymer that becomes hard when heated. The energy curable resin is one that becomes hard when exposed to activation energy rays. Although the thermosetting resin would pose a problem of thermal damage to the base 11, the energy curable resin is free of this problem. More detail of the energy curable resin is explained hereinafter.

The hard coat layer 21 may have the refractive index of preferably from 1.62 to 1.68. Such high refractive index can be obtained by adding inorganic particles to the selected resin. Having the refractive index as high as 1.6-2.7 generally, the inorganic particles are added to the energy curable resin or the thermosetting resin, and the hard coat layer 21 will then have high refractive index. In this case, the inorganic particles can be the same as those used in the first layer 12. The hard coat layer 21 may also have the thickness from 1 μm to 10 μm preferably. In this thickness range, the physical functions such as an optical function and the rub resistance will be adequate, and the adhesive strength to the first layer 12 is high. The hard coat layer 21 can be formed by any of the forming methods above, and the explanation of the forming method is thus omitted.

The anti-reflection layer 22 preferably has lower refractive index than the hard coat layer 21. However, the anti-reflection layer 22 can be composed of a low refractive index layer and a high refractive index layer. When formed into such a multilayer structure, the anti-reflection layer 22 shows excellent rub resistance and optical property, as being relatively hard on the surface and able to prevent the light reflection on the hard coat layer 21. In the present invention, the low refractive index layer has a 1.35-1.50 refractive index, and the high refractive index layer has a 1.55-1.90 refractive index.

Now, the energy curable resin for the hard coat layer 21 is explained. The energy curable resin may preferably have two or more acrylic groups in the molecule. Such resin may be, for example, polyol polyacrylates such as ethylene glycol diacrylate, 1,6-hexanediol diacrylate, bisphenol-A diacrylate, trimethylolpropane triacrylate, dimethylolpropane tetracrylate, pentaerythritol triacrylate, pentaerythritol tetracrylate, dipentaerythritol pentacrylate, and dipentaerythritol hexacrylate, polyfunctional urethane acrylate derived from the chemical reaction of polyisocyanate curable resin and hydroxyl containing acrylate such as hydroxyl ethyl acrylate (methacrylate), and polyfunctional epoxy acrylate derived from the chemical reaction of polyepoxy curable resin and hydroxyl containing acrylate such as hydroxyl ethyl acrylate. Also usable is a polymer having an ethylene unsaturated group in the side chain.

When the energy curable resin is used, it is preferred to irradiate a beam of ionizing radiation, such as gamma rays, alpha rays, electron rays, or ultraviolet rays, to the coating layer. Since these rays can encourage the curing of the resin effectively and efficiently, the coating layer, i.e., the hard coat layer 21 will have an adequate degree of hardness. The hard coat layer 21 is preferably formed by firstly applying a coating liquid onto the first layer 12 to form a coating layer, and then irradiating the ultraviolet rays to the coating layer. This procedure allows for speedy formation of the hard coat layer 21 with a uniform thickness and a uniform optical property. In this case, it is preferred to use a diluted solution of the energy curable resin and a polymerization initiator as the coating liquid because the diluted solution allows to form a uniformly thick coating layer easily.

In the present invention, a single kind or several kinds of the polymerization initiator can be used. Although the additive amount of the polymerization initiator is not limited particularly, it is preferably 0.1-15 wt. % with respect to a sum of the curable resin component containing unsaturated ethylene group and the curable resin component containing cyclic polymer group. More preferably, the additive amount is 1-10 wt. % with respect to the sum.

The hard coat layer 21 with high refractive index can be formed from a composition of a polyfunctional acrylate monomer, as a resin component, and inorganic particles such as alumina and titanium oxide. This kind of composition is described in Japanese Patent No. 1815116, and also described as a photopolymerizable composition with inorganic alumina particles in Japanese Patent No. 1416240, the contents of which can be used in the present invention. It is, however, to be understood that the hard coat layer 21 is not limited to these compositions.

Alternatively, the hard coat layer 21 with high refractive index can also be formed from high refractive index polymers. The high refractive index polymers maybe, for example, a polymer with cyclic groups, a polymer with halogen atoms except fluorine, and a polymer with cyclic groups and halogen atoms except fluorine. In this respect, the cyclic groups include aromatic, heterocyclic, and aliphatic cyclic groups. It is possible to use a commercial anti-reflection coating material for the anti-reflection layer 22. Such commercial coating materials are, for example, TT1148, TU2111, TU2153 (JSR Corporation) for the low refractive index layer, and Z7410, Z7410B, Z7410C, Z7410D, Z7410E (JSR Corporation) for the high refractive index layer.

Although the first layer and the second layer in the above embodiments are formed on the upper surface of the base 11 as shown in FIG. 1 and FIG. 2, they can be formed on either surface of the base 11. In other words, the first and the second layers are formed at least one surface of the base 11 and, even if they are formed on both surfaces of the base 11, the effect of the present invention is also the same.

The multilayer film of the present invention can be used as an optical film in liquid crystal displays, plasma displays, organic EL displays, SED displays, and CRT displays. These display devices are thoroughly described in, for example, "Advanced Display Technology" (edited by Chizuka Tani, published by Kyoritsu Shuppan Co., Ltd., 1998), "EL, PDP, and LCD Displays" (issued by Toray Research Center, Inc., 2001), "Color Liquid Crystal Display" (edited by Shunsuke Kobayashi, published by Sangyo Tosho Publishers, Inc., 1990).

The first layer and the second layer are either the prism layer, the anti-reflection layer, the light diffusion layer, the anti-glare layer, or the hard coat layer, and the appropriate selection of these functional layers give an excellent optical property to the multilayer film. The multilayer film thus composed is suitable for a prism film and an anti-reflection film of the liquid Crystal displays, a light diffusion film, a hard coat film, an IR absorbing film of the plasma displays, an electromagnetic shielding film, a toning film, and such optical films. The details of these films are described in the above publications and the August, 2002 issue of Electronic Journal, page 74.

Next, the present invention is described in more detail using several working examples and comparative examples. It is to be understood, however, that these examples are illustrative only, and not intended to limit the scope of the invention. Accordingly, various changes may be made to the kind, the amount, and the composition of the materials set forth below without departing from the scope of the present invention. Additionally, the basic procedure and condition are explained only in some typical examples such as working example 1.

WORKING EXAMPLE 1

The multilayer film 10, shown in FIG. 1, was produced as a working example 1 by the following procedure. The second layer 13 was composed of only the hard coat layer 21.

(Base)

Firstly, polyethylene terephthalate (hereinafter, PET) polycondensed with antimony trioxide catalyst to have intrinsic viscosity of 0.66 was dried out to include a moisture content of 50 ppm or less, and then melted in an extruder at 280-300° C. This molten PET resin was cast from a die onto an electrostatically energized chill roll, and an amorphous film was obtained. This amorphous film was stretched, firstly along the longitudinal direction until it gets 3.3 times as large as the initial length, and then along the width direction until it gets 3.8 times as large as the initial width, so that the base 11 with a 100 μm thickness was obtained. The refractive index of this base 11 was 1.65.

(First Layer)

The base 11 was conveyed at a speed of 70 m/min, and a corona discharge treatment at the UV intensity of 730 J/m² was carried out on both surfaces of the base 11. Then, a coating liquid A of the following composition was applied to the both surfaces of the base 11 so as to form a coating layer, i.e., a precursor of the first layer 12. This coating layer was dried for 1 minute at 180° C., and the first layer 12 was formed. The amount of the coating liquid A was 4.4 ml/m².

At this point, the thickness of the first layer 12 on the base 11 was measured at a 200000-fold magnification using a transmission electron microscope (JEM-2010: JEOL Ltd.), and it was 85 nm. Also, the refractive index of the first layer 12 was measured by the following method, and it was 1.65.

(Refractive Index Measurement of First Layer)

Firstly, the coating liquid A was applied to a commercial silicon wafer to form a coating layer. Then the coating layer was dried for 10 minutes at 105° C., and a sample with a thickness of 3-4 μm was obtained. This sample was measured for the refractive index at the wavelengths of 660 nm and 850 nm by the prism-coupler method using a refractive index measurement device (SPA-4000: Sairon Technology, Inc.). The results and these wavelengths were assigned to the Sellmeier equation expressed as the following equation 1 so as to figure constants A and B, and the refractive index at 550 nm was then calculated from these constants A and B.

$$n^2-1=A\lambda^2/(\lambda^2-B) \quad \text{Equation 1}$$

where $\lambda$ is a wavelength (nm) of measurement, n is the refractive index at this wavelength, and A and B are both constants.

(Coating Liquid A)

The following materials were mixed, and then combined with distilled water to compose the coating liquid A having a total mass of 1500 pts.mass.

Polyester (FINETEX ES650: Dainippon Ink And Chemicals Incorporated: solid content 29%) . . . 58.8 pts.mass Carbodiimide compound (CARBODILITE V-02-L2: Nisshinbo Industries, Inc.: 10% solid content aqueous solution: carbodiimide equivalent weight 385) . . . 34.1 pts.mass Carnauba wax (Cellosol 524: Chukyo Yushi Co., Ltd.: 3% solid content aqueous solution) . . . 11.4 pts.mass Surfactant A (RAPISOL B-90: NOF Corporation: 1% solid content aqueous solution: anionic) . . . 17.0 pts.mass Surfactant B (NAROACTY: Sanyo Chemical Industries, Ltd.: 5% solid content aqueous solution: non-ionic) . . . 34.1 pts.mass $1^{st}$ particle water dispersion (silica particle water dispersion (water dispersion of OX-50: Nippon Aerosil Co., Ltd.): 10% solid content aqueous solution ) . . . 4.1 pts.mass $2^{nd}$ particle water dispersion (tin oxide water dispersion (antimony-doped tin oxide SN-38F: Ishihara Sangyo Kaisha, Ltd.): 17% solid content aqueous solution: average particle diameter 30-38 nm) . . . 260.7 pts.mass (Hard Coat Layer)

UV curable resin A (Z7410B: refractive index 1.65: JSR Corporation) was applied in an approximately 9 μm thickness to one of the first layers 12, and this coating layer (or resin layer) was dried for 1 minute at 70° C. By ultraviolet radiation from a high pressure mercury lamp to the dried coating layer, the resin was hardened and the hard coat layer with a 3 μm thickness was formed as the second layer. As for the ultraviolet ray, the radiation intensity was 1000 mj/cm².

WORKING EXAMPLE 2

A working example 2 was produced by the same manner as the working example 1, except that the $2^{nd}$ particle water dispersion in the coating liquid A was changed to zirconium oxide water dispersion. This zirconium oxide water dispersion was a zirconium oxide sol (HZ-307W6: Nissan Chemical Industries, Ltd.: 20% solid content aqueous solution), and the amount was 153 pts.mass.

WORKING EXAMPLE 3

A working example 3 was produced by the same manner as the working example 1, except that the $2^{nd}$ particle water dispersion in the coating liquid A was changed to indium oxide water dispersion. The indium oxide water dispersion was EP ITO DL-1 (product name: JEMCO Inc.: 20% solid content aqueous solution), and the amount was 115 pts.mass.

WORKING EXAMPLE 4

A working example 4 was produced by the same manner as the working example 1, except that the $2^{nd}$ particle water dispersion in the coating liquid A was changed to a particle water dispersion E (10% solid content aqueous solution) composed of the following materials. The amount of the particle water dispersion E was 26 pts.mass.

(Particle Water Dispersion E)

Ionic water . . . 450 pts.mass

Titanium dioxide particles (Idemitsu-Titania IT-W: Idemitsu Kosan Co., Ltd.) . . . 50 pts.mass Firstly, the titanium dioxide particles were added to the ionic water that was being stirred continuously with a stirrer (ROBOMICS: Rrimix Corporation). From this point, the ionic water was kept stirred for 10 minutes to disperse the particles therein. Then, the particles were further dispersed for 8 minutes using an ultrasonic distribution machine (UH-600S: SMT Co., Ltd.) with the output volume at 9.0, and the particle water dispersion E was obtained.

WORKING EXAMPLE 5

A working example 5 was produced by the same manner as the working example 1, except that the carbodiimide compound was not added to the coating liquid A.

WORKING EXAMPLE 6

A working example 6 was produced by the same manner as the working example 1, except that the polyester in the coating liquid A was changed to acrylic resin (NeoCryl XK-12: Kusumoto Chemicals, Ltd.: 45% solid content), and that the $2^{nd}$ particle water dispersion was increased to 401 pts.mass. The amount of the acrylic resin was 37.9 pts.mass.

WORKING EXAMPLE 7

A working example 7 was produced by the same manner as the working example 1, except that the polyester in the coating liquid A was changed to urethane (SUPERFLEX 860: Dai-ichi Kogyo Seiyaku Co., Ltd.: 40% solid content), and that the $2^{nd}$ particle water dispersion was increased to 401 pts.mass. The amount of the urethane was 42.6 pts.mass.

WORKING EXAMPLE 8

A working example 8 was produced by the same manner as the working example 1, except that the first layer 12 was made into 30 nm thickness.

WORKING EXAMPLE 9

A working example 9 was produced by the same manner as the working example 1, except that the first layer 12 was made into 250 nm thickness.

WORKING EXAMPLE 10

A working example 10 was produced by the same manner as the working example 1, except that the $2^{nd}$ particle water dispersion was reduced to 200 pts.mass.

WORKING EXAMPLE 11

A working example 11 was produced by the same manner as the working example 1, except that the $2^{nd}$ particle water dispersion was increased to 350 pts.mass.

WORKING EXAMPLE 12

A working example 12 was produced by the same manner as the working example 1, except that the hard coat layer was formed from the solution of the following materials.
UV curable resin A . . . 71% by mass
UV curable resin B (Z7410A: JSR Corporation: refractive index 1.58) . . . 29% by mass

WORKING EXAMPLE 13

A working example 13 was produced by the same manner as the working example 1, except that the hard coat layer was formed from the solution of the following materials.
UV curable resin A . . . 50% by mass
UV curable resin C (Z7410C: JSR Corporation: refractive index 1.69) . . . 50% by mass

WORKING EXAMPLE 14

Masterbatch pellets of PET with 12% by mass of UV-absorbing agent A (CYASORB UV-3638: Cytec Industries Inc.) were mixed to the PET, and extruded to form the base 11. The amount of the UV-absorbing agent A was adjusted to 0.7% by mass with respect to the entire amount of the base 11. Except for this, a working example 14 was produced by the same manner as the working example 1.

WORKING EXAMPLE 15

A working example 15 was produced by the same manner as the working example 2, except that the base 11 contained 0.7% by mass of the UV-absorbing agent A.

WORKING EXAMPLE 16

A working example 16 was produced by the same manner as the working example 3, except that the base 11 contained 0.7% by mass of the UV-absorbing agent A.

WORKING EXAMPLE 17

A working example 17 was produced by the same manner as the working example 4, except that the base 11 contained 0.7% by mass of the UV-absorbing agent A.

WORKING EXAMPLE 18

A working example 18 was produced by the same manner as the working example 5, except that the base 11 contained 0.7% by mass of the UV-absorbing agent A.

WORKING EXAMPLE 19

A working example 19 was produced by the same manner as the working example 6, except that the base 11 contained 0.7% by mass of the UV-absorbing agent A.

WORKING EXAMPLE 20

A working example 20 was produced by the same manner as the working example 7, except that the base 11 contained 0.7% by mass of the UV-absorbing agent A.

WORKING EXAMPLE 21

A working example 21 was produced by the same manner as the working example 8, except that the base 11 contained 1.2% by mass of the UV-absorbing agent A.

WORKING EXAMPLE 22

A working example 22 was produced by the same manner as the working example 9, except that the base 11 contained 1.0% by mass of the UV-absorbing agent A.

WORKING EXAMPLE 23

A working example 23 was produced by the same manner as the working example 10, except that the base 11 contained 0.5% by mass of the UV-absorbing agent A.

WORKING EXAMPLE 24

A working example 24 was produced by the same manner as the working example 11, except that the base 11 contained 0.4% by mass of the UV-absorbing agent A.

WORKING EXAMPLE 25

A working example 25 was produced by the same manner as the working example 12, except that the base 11 contained 0.5% by mass of the UV-absorbing agent A.

WORKING EXAMPLE 26

A working example 26 was produced by the same manner as the working example 13, except that the base 11 contained 0.4% by mass of the UV-absorbing agent A.

COMPARATIVE EXAMPLE 1

A comparative example 1 was produced by the same manner as the working example 1, except that the carbodiimide compound was not added to the coating liquid A, and that the amount of the $2^{nd}$ particle water dispersion was adjusted to set the refractive index of the first layer 12 to 1.60.

COMPARATIVE EXAMPLE 2

A comparative example 2 was produced by the same manner as the working example 1, except that the carbodiimide compound was not added to the coating liquid A, and that the amount of the $2^{nd}$ particle water dispersion was adjusted to set the refractive index of the first layer 12 to 1.70.

COMPARATIVE EXAMPLE 3

A comparative example 3 was produced by the same manner as the working example 1, except that the carbodiimide compound was not added to the coating liquid A, and that the hard coat layer was formed from the solution of the following materials.

UV curable resin A . . . 29% by mass
UV curable resin B . . . 71% by mass

COMPARATIVE EXAMPLE 4

A comparative example 4 was produced by the same manner as the working example 1, except that the carbodiimide compound was not added to the coating liquid A, and that the hard coat layer was formed from the solution of the following materials.

UV curable resin C . . . 75% by mass
UV curable resin D (Z7410D: JSR Corporation: refractive index 1.73) . . . 25% by mass

COMPARATIVE EXAMPLE 5

A comparative example 5 was produced by the same manner as the comparative example 1, except that the base 11 contained 0.7% by mass of the UV-absorbing agent A.

COMPARATIVE EXAMPLE 6

A comparative example 6 was produced by the same manner as the comparative example 3, except that the base 11 contained 0.7% by mass of the UV-absorbing agent A.

Consequently, all these examples were evaluated for (1) adhesion between the base 11 and the first layer 12, (2) adhesion between the first layer 12 and the second layer 13, (3) surface condition, (4) color rainbow effect, and (5) an ultraviolet blocking property. The procedures and the results were as follows.

[1. Adhesion Between Base and First Layer]

Firstly, the base 11 was coated with the coating liquid A, and this test sample was dipped for 16 hours in 60° C. distilled water. Out of the distilled water, the sample was wiped lightly with a paper (Kimwipes S-200: Nippon Paper Crecia Co., Ltd.) to remove water drops from the surface, and immediately thereafter scratched with a 0.1 R diamond stylus of a scratch tester (HEIDON-18: Shinto Kagaku Co., Ltd.). The scratched surface was then observed with a microscope at a 100-fold magnification, and also with eyes, so as to judge the degree of peeling off of the first layer 12. Based on the judgment, the adhesive strength between the base and the first layer was ranked on a five point scale. In this evaluation, rank B and above are acceptable levels of quality. In this respect, the load on the diamond stylus was 200 g.

Rank A: no peeling off,
Rank B: the area of peeling off was below 30% of the entire scratched area,
Rank C: the area of peeling off was from 30% to 70% of the entire scratched area,
Rank D: the area of peeling off was from 70% to 100% of the entire scratched area,
Rank E: the area of peeling off was the entire scratched area and its surrounding.

[2. Adhesion Between First and Second Layers]

Firstly, the multilayer film was humidity conditioned at 25° C and 60% RH. Then, using a single-edged razorblade, six vertical and horizontal slits were scratched into this test sample to leave 25 blocks on the surface, and a cellulose tape (#405: width 24mm: Nichiban Co., Ltd.) was attached to these blocks. The cellulose tape was rubbed with an eraser to stick firmly to the surface, and then peeled off along a 90-degree direction. Based on the number of the blocks coming off with the cellulose tape, the adhesive strength between the first and the second layers was ranked on a five point scale. In this evaluation, rank B and above are acceptable levels of quality. In this respect, each slit was 3 mm width.

Rank A: no peeled block,
Rank B: the number of peeled blocks was below 1 but some blocks partly peeled off,
Rank C: the number of peeled blocks was not less than 1 and less than 3,
Rank D: the number of peeled blocks was not less than 3 and less than 20,
Rank E: the number of peeled blocks was 20 or more.

[3. Surface Condition]

Firstly, the same test sample as the evaluation 2 was put on a desk covered with a black doeskin wool, and illuminated by diffuse light from a fluorescent lamp through a milky acryl plate. Reflection light was observed with eyes, and the surface condition was ranked on a three point scale. In this evaluation, rank B and above are acceptable levels of quality.

Rank A: no uneven coating was found in the samples with and without a black surface finish,
Rank B: uneven coating was found with eyes only in the black finish sample but not found in the unblackened sample,
Rank C: uneven coating was found with eyes in both samples with and without the black surface finish.

For the visual observation in this Evaluation 3, the sample was blackened on the surface to set the transparency at 500 nm to 1% or less, so as to prevent the reflection of light on the rear surface. Specifically, the surface opposite to the irradiation surface was painted in black with a marker pen (Artline, with black solvent ink KR-20: Shachihata Inc) and dried.

[4. Color Rainbow Effect]

The same test sample as the evaluation 3 was prepared, and the surface without the hard coat layer was rubbed with a sandpaper and then painted in black with the same marker pen as the evaluation 3 for anti-reflection purpose. This test sample was placed on a desk, and the hard coat layer was irradiated by a three band fluorescent lamp (FL20SS EX-D/18: Matsushita Electric Industrial Co., Ltd.) from 30 cm above the desk. The irradiated hard coat layer was observed with eyes to find a spot of light interference, which was then ranked, as the color rainbow effect, on a five point scale. In this evaluation, rank C and above are acceptable levels of quality.

Rank A: no color rainbow effect was observed,
Rank B: color rainbow effect was hardly observed,
Rank C: color rainbow effect was observed slightly,
Rank D: color rainbow effect was observed strongly,
Rank E: color rainbow effect was observed very strongly.

[5. Ultraviolet Blocking Property]

A multilayer film of the base 11 and the first layer 12 was prepared as a test sample, and its light transmittance was measured using 380 nm wavelength light. Based on the measurement result, the ultraviolet blocking property was ranked on a five point scale, where rank C and above are acceptable levels of quality. In this evaluation, the light transmittance was measured by an UV-visible spectrophotometer (V-630: JASCO International Co., Ltd.) set for a fixed wavelength measurement, i.e., a "fast" response.

Rank A: from 0% to less than 1%,
Rank B: from 1% to less than 2%,
Rank C: from 2% to less than 3%,
Rank D: from 3% to less than 10%,
Rank E: 10% and above.

The evaluation results and the detail of each example are shown in TABLE 1 to TABLE 4 below, in which the marks are as follows;
WE: working example,
CE: comparative example,
L: first layer,
U: UV-absorbing agent,
R: refractive index,
a1: polyester (ES-650: Ishihara Sangyo Kaisha, Ltd.),
a2: acrylic resin (XK-12: Kusumoto Chemicals, Ltd.),
a3: urethane (SF-860: Dai-ichi Kogyo Seiyaku Co., Ltd.),
x: carbodiimide compound (CARBODILITE V-02-L2: Nisshinbo Industries, Inc.)

y1: tin oxide water dispersion (SN-38F: Ishihara Sangyo Kaisha, Ltd.),
y2: zirconium oxide water dispersion (HZ-307W6: Nissan Chemical Industries, Ltd.),
y3: indium oxide\water dispersion (EP ITODL-1: JEMCO Inc.),
y4: titanium oxide water dispersion,
$\eta1$: refractive index of the base,
$\eta2$: refractive index of the first layer,
$\eta3$: refractive index of the hard coat layer,
$|\eta1-\eta2|$: difference in refractive index between the base and the first layer,
$|\eta1-\eta3|$: difference in refractive index between the base and the hard coat layer (the second layer).

TABLE 1

| | | WE1 | WE2 | WE3 | WE4 | WE5 | WE6 | WE7 | WE8 | WE9 |
|---|---|---|---|---|---|---|---|---|---|---|
| L | FIRST BINDER | a1 | a1 | a1 | a1 | a1 | a2 | a3 | a1 | a1 |
| | CARBODIIMIDE COMPOUND | x | x | x | x | none | x | x | x | x |
| | 2$^{nd}$ PARTICLE DISPERSION | y1 | y2 | y3 | y4 | y1 | y1 | y1 | y1 | y1 |
| | THICKNESS (nm) | 85 | 82 | 82 | 73 | 75 | 85 | 85 | 30 | 250 |
| U | DENSITY OF UV-ABSORBING AGENT A (%) | none | none | none | none | none | none | none | none | none |
| | LIGHT TRANSMITTANCE ($\lambda$ = 380 nm) | 82.0 | 81.9 | 82.0 | 82.1 | 81.9 | 82.0 | 82.0 | 82.0 | 81.9 |
| R | $\eta1$ | 1.65 | 1.65 | 1.65 | 1.65 | 1.65 | 1.65 | 1.65 | 1.65 | 1.65 |
| | $\eta2$ | 1.65 | 1.65 | 1.65 | 1.65 | 1.65 | 1.65 | 1.65 | 1.65 | 1.65 |
| | $\eta3$ | 1.65 | 1.65 | 1.65 | 1.65 | 1.65 | 1.65 | 1.65 | 1.65 | 1.65 |
| | $|\eta1-\eta2|$ | 0 | 0 | 0 | 0.01 | 0 | 0 | 0 | 0 | 0 |
| | $|\eta1-\eta3|$ | 0 | 0 | 0 | 0 | 0 | 0 | 0 | 0 | 0 |
| | EVALUATION 1 | A | A | A | A | B | A | A | A | A |
| | EVALUATION 2 | A | A | A | A | B | A | A | A | A |
| | EVALUATION 3 | A | A | A | A | A | A | A | B | B |
| | EVALUATION 4 | A | A | A | A | A | A | A | A | A |
| | EVALUATION 5 | E | E | E | E | E | E | E | E | E |

TABLE 2

| | | WE10 | WE11 | WE12 | WE13 | WE14 | WE15 | WE16 | WE17 | WE18 |
|---|---|---|---|---|---|---|---|---|---|---|
| L | FIRST BINDER | a1 | a1 | a1 | a1 | a1 | a1 | a1 | a1 | a1 |
| | CARBODIIMIDE COMPOUND | x | x | x | x | x | x | x | x | none |
| | 2$^{nd}$ PARTICLE DISPERSION | y1 | y1 | y1 | y1 | y1 | y2 | y3 | y4 | y1 |
| | THICKNESS (nm) | 80 | 90 | 85 | 85 | 85 | 82 | 82 | 73 | 75 |
| U | DENSITY OF UV-ABSORBING AGENT A (%) | none | none | none | none | 0.70 | 0.70 | 0.70 | 0.70 | 0.70 |
| | LIGHT TRANSMITTANCE ($\lambda$ = 380 nm) | 81.9 | 82.0 | 82.1 | 82.2 | 0.60 | 0.60 | 0.60 | 0.60 | 0.60 |
| R | $\eta1$ | 1.65 | 1.65 | 1.65 | 1.65 | 1.65 | 1.65 | 1.65 | 1.65 | 1.65 |
| | $\eta2$ | 1.63 | 1.67 | 1.65 | 1.65 | 1.65 | 1.65 | 1.65 | 1.66 | 1.65 |
| | $\eta3$ | 1.65 | 1.65 | 1.63 | 1.67 | 1.65 | 1.65 | 1.65 | 1.65 | 1.65 |
| | $|\eta1-\eta2|$ | 0.02 | 0.02 | 0 | 0.01 | 0 | 0 | 0 | 0.01 | 0 |
| | $|\eta1-\eta3|$ | 0 | 0 | 0.02 | 0.02 | 0 | 0 | 0 | 0 | 0 |
| | EVALUATION 1 | A | A | A | A | A | A | A | A | B |
| | EVALUATION 2 | A | A | A | A | A | A | A | A | B |
| | EVALUATION 3 | A | A | A | A | A | A | A | A | A |
| | EVALUATION 4 | B | B | B | B | A | A | A | A | A |
| | EVALUATION 5 | E | E | E | E | A | A | A | A | A |

TABLE 3

| | | WE19 | WE20 | WE21 | WE22 | WE23 | WE24 | WE25 | WE26 |
|---|---|---|---|---|---|---|---|---|---|
| L | FIRST BINDER | a2 | a3 | a1 | a1 | a1 | a1 | a1 | a1 |
| | CARBODIIMIDE COMPOUND | x | x | x | x | x | x | x | x |
| | 2$^{nd}$ PARTICLE DISPERSION | y1 | y1 | y1 | y1 | y1 | y1 | y1 | y1 |
| | THICKNESS (nm) | 85 | 85 | 30 | 250 | 80 | 90 | 85 | 85 |
| U | DENSITY OF UV-ABSORBING AGENT A (%) | 0.70 | 0.70 | 1.20 | 1.00 | 0.50 | 0.40 | 0.50 | 0.40 |
| | LIGHT TRANSMITTANCE ($\lambda$ = 380 nm) | 0.60 | 0.60 | 0.60 | 0.60 | 2.55 | 2.61 | 2.55 | 2.61 |
| R | $\eta 1$ | 1.65 | 1.65 | 1.65 | 1.65 | 1.65 | 1.65 | 1.65 | 1.65 |
| | $\eta 2$ | 1.65 | 1.65 | 1.65 | 1.65 | 1.63 | 1.67 | 1.65 | 1.65 |
| | $\eta 3$ | 1.65 | 1.65 | 1.65 | 1.65 | 1.65 | 1.65 | 1.63 | 1.67 |
| | $|\eta 1-\eta 2|$ | 0 | 0 | 0 | 0 | 0.02 | 0.02 | 0 | 0 |
| | $|\eta 1-\eta 3|$ | 0 | 0 | 0 | 0 | 0 | 0 | 0.02 | 0.02 |
| | EVALUATION 1 | A | A | A | A | A | A | A | A |
| | EVALUATION 2 | A | A | A | A | A | A | A | A |
| | EVALUATION 3 | A | A | B | B | A | A | A | A |
| | EVALUATION 4 | A | A | A | A | B | B | B | B |
| | EVALUATION 5 | A | A | A | A | C | C | C | C |

TABLE 4

| | | CE1 | CE2 | CE3 | CE4 | CE5 | CE6 |
|---|---|---|---|---|---|---|---|
| L | FIRST BINDER | a1 | a1 | a1 | a1 | a1 | a1 |
| | CARBODIIMIDE COMPOUND | none | none | none | none | none | none |
| | 2$^{nd}$ PARTICLE DISPERSION | y1 | y1 | y1 | y1 | y1 | y1 |
| | THICKNESS (nm) | 62 | 83 | 75 | 75 | 62 | 75 |
| U | DENSITY OF UV-ABSORBING AGENT A (%) | none | 0.00 | none | 0.00 | 0.70 | 0.70 |
| | LIGHT TRANSMITTANCE ($\lambda$ = 380 nm) | 81.8 | 81.90 | 81.8 | 81.90 | 0.60 | 0.60 |
| R | $\eta 1$ | 1.65 | 1.65 | 1.65 | 1.65 | 1.65 | 1.65 |
| | $\eta 2$ | 1.60 | 1.70 | 1.65 | 1.65 | 1.60 | 1.65 |
| | $\eta 3$ | 1.65 | 1.65 | 1.60 | 1.70 | 1.65 | 1.60 |
| | $|\eta 1-\eta 2|$ | 0.05 | 0.05 | 0 | 0 | 0.05 | 0 |
| | $|\eta 1-\eta 3|$ | 0 | 0 | 0.05 | 0.05 | 0 | 0.05 |
| | EVALUATION 1 | B | B | B | B | B | B |
| | EVALUATION 2 | B | B | B | B | B | B |
| | EVALUATION 3 | A | A | A | A | A | A |
| | EVALUATION 4 | D | E | D | D | D | D |
| | EVALUATION 5 | E | E | E | E | A | A |

In spite of a slight difference in the type of first binder and particles, all the working examples 1 to 26 showed excellent results in the evaluations 1 through 4 because their $|\eta 1-\eta 2|$ and $|\eta 1-\eta 3|$ were set to 0.03 or below. To the contrary, the comparative examples 1 to 6, with their $|\eta 1-\eta 2|$ and $|\eta 1-\eta 3|$ set to 0.05, showed unacceptable results in the evaluation 4 about the color rainbow effect although they showed acceptable results in the evaluations 1 through 3. Additionally, the result of the evaluation 5 indicates that the ultraviolet blocking property is improved significantly by adding a given amount of UV absorbing agent to the polyester of the base.

Using the multilayer films of the working examples 1 to 26, i.e., the films with excellent evaluation results, anti-reflection films were produced by forming two anti-reflection layers on each multilayer film. These anti-reflection films were evaluated for both the adhesion and the color rainbow effect, and all the films showed good adhesion between the layers but little color rainbow effect, proving their excellent optical properties.

With regard to the anti-reflection layer, it was formed by firstly applying UV curable resin E (Z7410E: JSR Corporation: refractive index 1.75) to the multilayer film, and then drying to harden this UV curable resin E to form a first layer with a 110 nm thickness. Consequently, the first layer was coated with UV curable resin F (TU2111: JSR Corporation: refractive index 1.39), which was then dried and hardened to be a second layer with 95 nm thickness.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A multilayer film comprising:
 a base made of polyester;
 a first layer on at least one surface of said base, said first layer containing particles and a binder, the particles composed mainly of either tin oxide, indium oxide, zirconium oxide, or titanium oxide, a difference $|\eta 1-\eta 2|$ of a refractive index $\eta 1$ of said base and a refractive index $\eta 2$ of said first layer being 0.03 or less; and
 a second layer on said first layer, a difference $|\eta 1-\eta 3|$ of said refractive index $\eta 1$ and a refractive index $\eta 3$ of said second layer being 0.03 or less,
 wherein said binder in said first layer is composed of polyester.

2. The multilayer film of claim 1, wherein said first layer contains a compound having plural carbodiimide structures in each molecule.

3. The multilayer film of claim 2, wherein said first layer has a uniform thickness from 20 nm to 400 nm.

4. The multilayer film of claim 1, wherein said polyester of said base is polyethylene terephthalate, and said $\eta 1$ and $\eta 2$ are both from 1.62 to 1.68.

5. The multilayer film of claim 4, wherein said base is a biaxially stretched member.

6. The multilayer film of claim 1, wherein said second layer is a hard coat layer.

7. The multilayer film of claim 6, wherein an anti-reflection layer is provided on top of said hard coat layer.

8. An image display device having a multilayer film, said multilayer film comprising:
a base made of polyester;
a first layer on at least one surface of said base, said first layer containing particles and a binder, the particles composed mainly of either tin oxide, indium oxide, zirconium oxide, or titanium oxide, a difference $|\eta 1-\eta 2|$ of a refractive index $\eta 1$ of said base and a refractive index $\eta 2$ of said first layer being 0.03 or less; and
a second layer on said first layer, a difference $|\eta 1-\eta 3|$ of said refractive index $\eta 1$ and a refractive index $\eta 3$ of said second layer being 0.03 or less,
wherein said binder in said first layer is composed of polyester.

* * * * *